United States Patent [19]

Nimke et al.

[11] Patent Number: 4,549,752

[45] Date of Patent: Oct. 29, 1985

[54] CONNECTOR FOR TUBULAR MEMBERS

[75] Inventors: Helmut E. Nimke, Tuxedo, N.Y.; William R. Thomas, Exton, Pa.

[73] Assignees: UMAC, Inc., Paoli, Pa.; Brooklyn Union Gas Company, Brooklyn, N.Y.; a part interest

[21] Appl. No.: 613,380

[22] Filed: May 25, 1984

Related U.S. Application Data

[63] Continuation-in-part of Ser. No. 292,455, Aug. 13, 1981, Pat. No. 4,465,309.

[51] Int. Cl.⁴ .................................................. F16L 21/06
[52] U.S. Cl. ........................................ 285/55; 285/373; 285/381; 285/DIG. 10; 285/DIG. 16
[58] Field of Search ................. 285/21, DIG. 16, 419, 285/373, 287, 3, 381, 55, DIG. 10; 138/99; 339/275 R, 275 T; 29/447

[56] References Cited

U.S. PATENT DOCUMENTS

| | | |
|---|---|---|
| 1,704,760 | 3/1929 | Parker . |
| 1,731,991 | 10/1929 | Tracy . |
| 1,914,741 | 6/1933 | Gysling . |
| 1,921,642 | 8/1933 | Stephenson . |
| 2,312,579 | 3/1943 | O'Brien . |
| 2,367,191 | 1/1945 | Bailey et al. . |
| 2,695,255 | 11/1954 | Avery . |
| 2,977,994 | 4/1961 | Xenis . |
| 3,149,646 | 9/1964 | Xenis . |
| 3,154,330 | 10/1964 | Clark et al. . |
| 3,229,998 | 1/1966 | Pennington . |
| 3,235,289 | 2/1966 | Jones . |
| 3,243,211 | 3/1966 | Wetmore . |
| 3,261,374 | 7/1966 | Anderson et al. . |
| 3,305,625 | 2/1967 | Ellis . |
| 3,329,740 | 7/1967 | Battersby . |
| 3,382,121 | 5/1968 | Sherlock . |
| 3,415,287 | 12/1968 | Heslop et al. . |
| 3,529,856 | 9/1970 | Smith et al. . |
| 3,582,457 | 6/1971 | Barthell . |
| 3,610,291 | 10/1971 | Heslop . |
| 3,656,783 | 4/1972 | Reeder . |
| 3,666,586 | 5/1972 | Lacey . |
| 3,686,747 | 8/1972 | Bagnulo . |
| 3,689,114 | 9/1972 | Meserole . |
| 3,700,265 | 10/1972 | Dufour et al. . |
| 3,770,556 | 11/1973 | Evans et al. . |
| 3,781,966 | 1/1974 | Lieberman . |

(List continued on next page.)

FOREIGN PATENT DOCUMENTS

| | | |
|---|---|---|
| 215402 | 1/1957 | Australia . |
| 2316464 | 1/1977 | France . |

*Primary Examiner*—Thomas F. Callaghan
*Attorney, Agent, or Firm*—Michael F. Petock

[57] ABSTRACT

A connecting device for connecting together tubular members is comprised of a resilient sheet member in the form of a coil having at least partially overlapping surfaces. The inner diameter of the sheet member coil is less than the outer diameter of the members to be joined. A layer of heat sensitive adhesive bonding material is provided over the inner surface and subsequently after the formation of the connection on the outer surface of the sheet member coil. The sheet member coil is expanded to a larger diameter against the resiliently inwardly directed force of the sheet member and held in the expanded condition by heat sensitive adhesive bonding material. The expanded larger diameter is of a sufficient diameter to receive the ends of the members to be joined. Once the members to be joined are inserted into the coil, the sheet member coil may be heated whereby the heat sensitive adhesive bonding material melts allowing the sheet member to contract inwardly forming a tight bond between the inner surface of the sheet member and the members being joined. The connecting device may be utilized to connect a tubular member and an expandable tubular member. The connection formed by heating in such case results in the sheet member coil assuming a minimal degree of frustro-conical shape with a limited flow of the adhesive bonding material from the area over the expandable unit to the area over the tubular member. After application of the second layer of heat sensitive adhesive bonding material on the outer surface of the sheet member coil, the joined expandable unit to the tubular member is provided as an assembled unit ready for field application.

16 Claims, 10 Drawing Figures

U.S. PATENT DOCUMENTS

| | | |
|---|---|---|
| 3,784,235 | 1/1974 | Kessler et al. |
| 3,847,694 | 11/1974 | Stewing |
| 3,899,807 | 8/1975 | Sovish et al. |
| 3,913,444 | 10/1975 | Otte |
| 3,957,382 | 5/1976 | Grevel, Jr. et al. |
| 3,975,039 | 8/1976 | Penneck et al. |
| 4,000,920 | 1/1977 | Horvath et al. |
| 4,043,857 | 8/1977 | Byrne et al. |
| 4,092,193 | 5/1978 | Brooks |
| 4,135,958 | 1/1979 | Wood |
| 4,165,104 | 8/1979 | van den Beld |
| 4,226,444 | 10/1980 | Bunyan |
| 4,257,630 | 3/1981 | Bartell et al. |
| 4,265,471 | 5/1981 | Nash |
| 4,274,662 | 6/1981 | de Groot et al. |
| 4,295,494 | 10/1981 | McGowan et al. |
| 4,310,184 | 1/1982 | Campbell |
| 4,326,737 | 4/1982 | Lehmann |
| 4,338,970 | 7/1982 | Krackeler et al. |

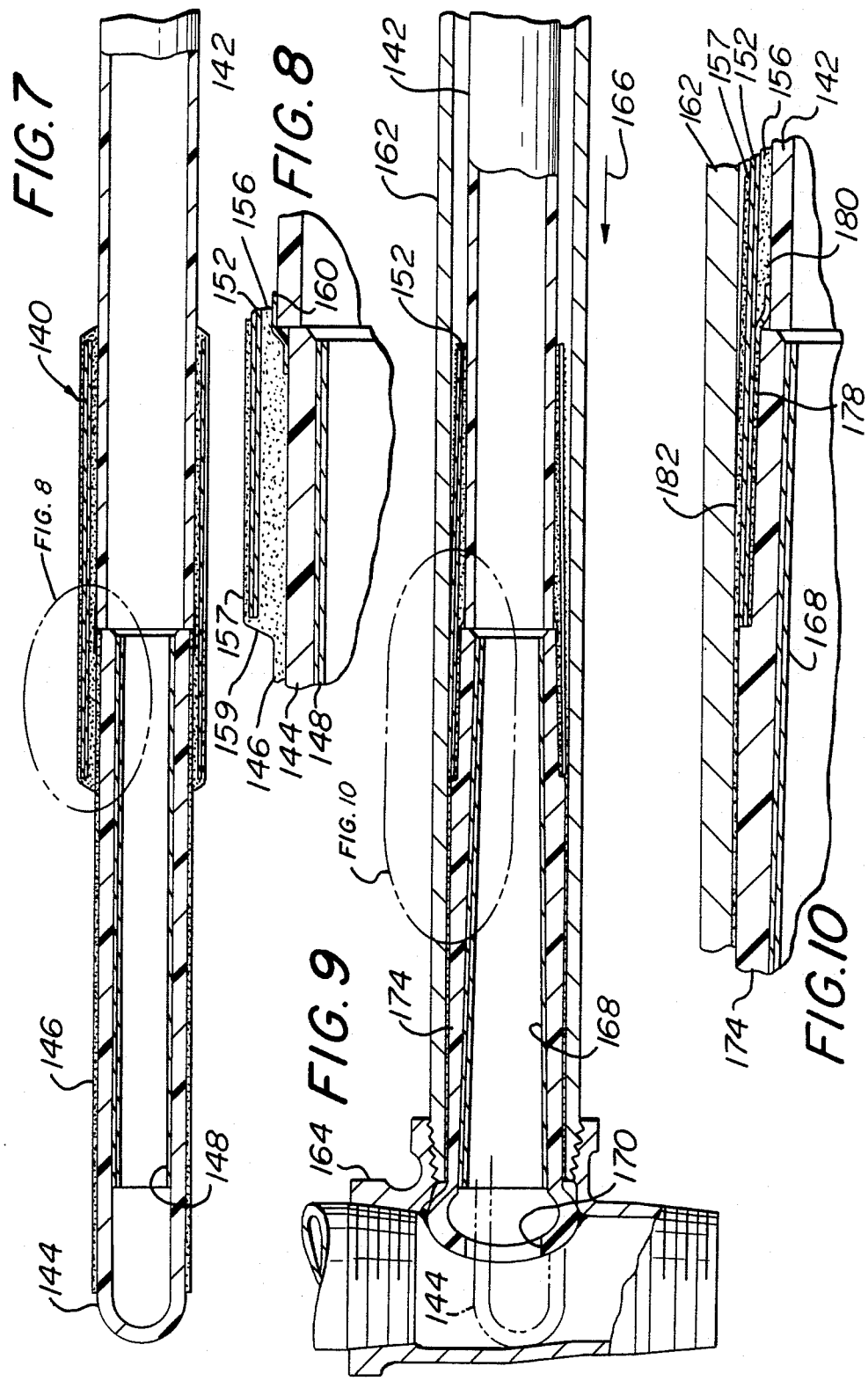

CONNECTOR FOR TUBULAR MEMBERS

CROSS-REFERENCE TO RELATED APPLICATION

This application is a continuation-in-part application of application Ser. No. 292,455, filed Aug. 13, 1981 now U.S. Pat. No. 4,465,309 by the inventors herein entitled CONNECTING OR REPAIR DEVICE. The subject matter in its entirety of this parent application is incorporated herein by reference.

BACKGROUND OF THE INVENTION

The present invention relates to improvements in devices to be used to connect together tubing and to connect tubing to expandable units.

SUMMARY OF THE INVENTION

The present invention enables the connecting together of tubular members and the connecting of a tubular member to an expandable tubular member.

Furthermore, the present invention provides a means of securing tubing to the inner wall of a pipe in which the tubing may be mounted by means of the expandable unit.

Briefly, in accordance with the present invention, a device is provided for connecting together tubular members. The device is comprised of a resilient sheet member in the form of a coil having at least partially overlapping surfaces. The inner diameter of the sheet member coil is less than the other diameter of the members to be joined. A first heat sensitive adhesive bonding material is applied to the inner surface of the sheet member coil. The sheet member coil is expanded to a larger diameter against the resiliently inwardly directed force of the sheet member and held in the expanded condition by at least one of the heat sensitive adhesive bonding materials. The expanded larger diameter is of a sufficient diameter to receive the ends of the members to be joined. Once the ends of the members to be joined are inserted into the coil sheet member, the coil sheet member may be heated whereby the heat sensitive adhesive bonding material holding the coil in the expanded condition melts allowing the sheet member to contract inwardly. Upon the cooling of the first heat sensitive bonding material, a tight and strong bond is formed between the inner surface of the sheet member and the joined tubular members. The cooled first heat sensitive bonding material forms a bond between the inner surface of the coil and the joined tubular members with the resilient sheet member coil providing support. After the first layer of heat sensitive bonding material cools, a second layer of heat sensitive bonding material is supplied to the outer surface of the sheet member coil.

In another embodiment of the present invention, the device of the present invention is utilized for forming a connection between a tubular member and a tubular member adapted for expansion. The coiled resilient sheet member with the first heat sensitive adhesive bonding material applied to the inner surface is utilized to form a connection between a tubular member and a tubular member adapted for expansion. After forming the connection between the tubular member and the tubular member adapted for expansion, a second layer of heat sensitive bonding material is applied to the outer surface of the coiled sheet member. The expandable unit with the tubular member joined thereto may be placed within a pipe or the like whereupon subsequent heating of the expandable unit, the expandable unit expands causing the resilient sheet member to comply assuming a minimal degree of frustro-conical shape with a limited flow of the adhesive bonding material from the area over the expandable unit to the area over the tubular member. This subsequent heating causes bonding of the outer surface of the coiled sheet member to the inner surface of the pipe.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 7 is a cross-sectional view of the apparatus of the present invention utilized in forming a connection between a tubular member and an expandable tubular member.

FIG. 8 is an enlarged cross-sectional view of the portion of FIG. 7 as illustrated in FIG. 7.

FIG. 9 is a cross-sectional view of a connection between a tubular member and an expanded tubular member as mounted within a pipe.

FIG. 10 is an enlarged cross-sectional view of the portion of FIG. 9 identified therein.

DETAILED DESCRIPTION OF THE PREFERRED EMBODIMENTS

Figure 1:
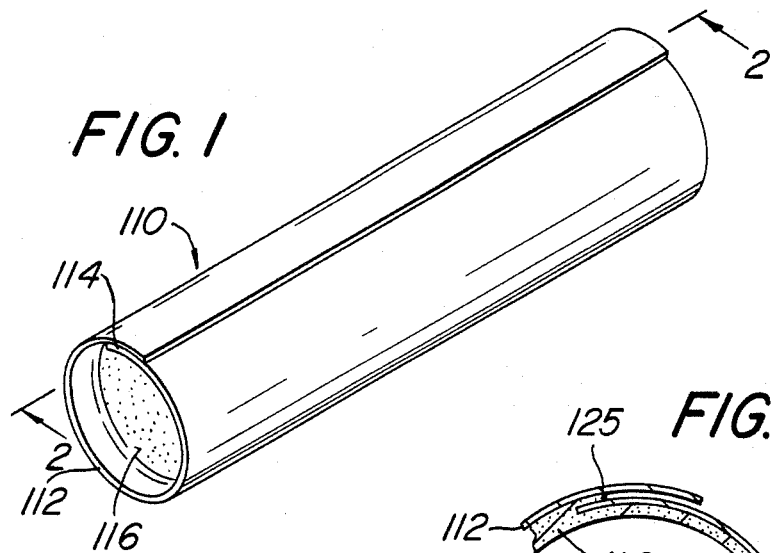
FIG. 1 is a view in perspective of a connecting device in accordance with the present invention.
Figure 2:
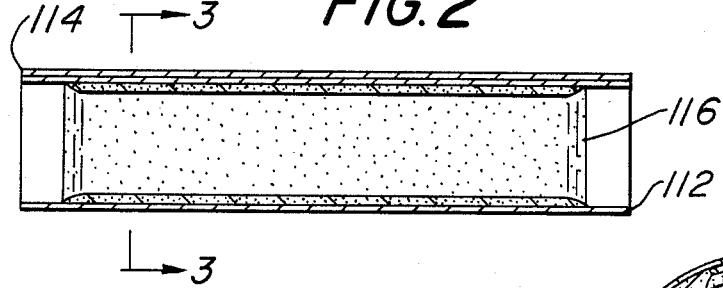
FIG. 2 is a cross-sectional view taken along line 2—2 of FIG. 1.

Referring now to the drawings in detail, wherein like numerals indicate like elements, there is shown in FIGS. 1 and 2 a connecting device 110 in accordance with the present invention. Connecting device 110 is comprised of a resilient sheet member 112 in the form of a coil. Resilient sheet member 112 has overlapping surfaces at 114. In other words, the resilient sheet member 112 has at least partially overlapping surfaces which may form a bonding area between or around the two ends of the resilient sheet member. A first heat sensitive adhesive bonding material 116 is applied to the inner surface of sheet member coil 112. Various heat sensitive bonding materials may be used, including, but not limited to, various ethelyne vinyl acetate resins or a commercially available adhesive manufactured by the Bostik Company of Middleton, Mass. and sold under the name BOSTIK 6323. Resilient sheet member 112 may be comprised of any suitable resilient metal material or synthetic plastic material. Suitable resilient sheet material may be stainless steel, brass, bronze, spring steel or other suitable resilient metalic material. Suitable resilient synthetic plastic materials may be polyethylene, polyolefin, vinyl or other suitable synthetic materials having the desired resiliency.

Figure 4:
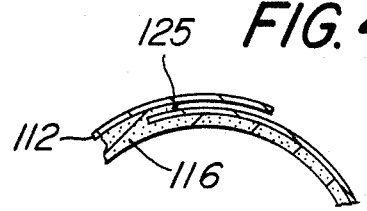
FIG. 4 is a broken away cross-sectional view of one embodiment of the structure of the overlapping surfaces.
Figure 3:
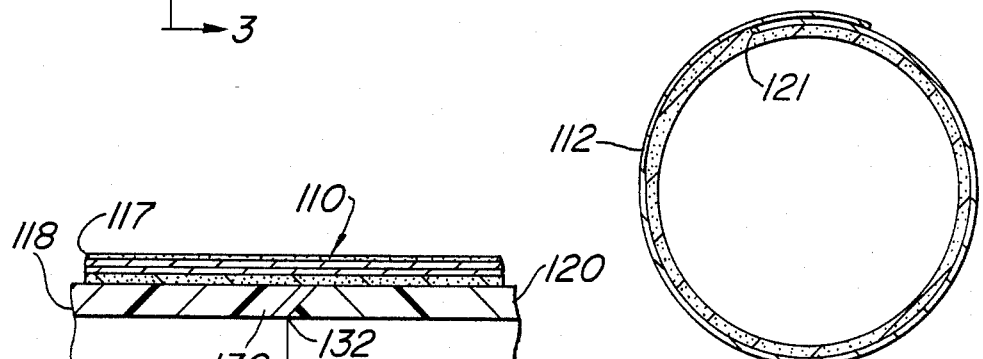
FIG. 3 is a cross-sectional view taken along line 3—3 of FIG. 2.
Figure 5:
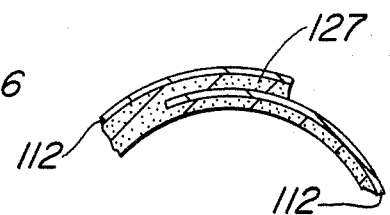
FIG. 5 is a broken away cross-sectional view of another embodiment illustrating the overlapping surfaces.

Resilient sheet member coil 112 is formed or constructed to have an unstressed or resting diameter less than the tubing to be connected or joined. In other words, the initial free inner diameter of the connecting device 110 is less than the outer diameter of the tubing to be connected. In constructing the connecting device 110, resilient sheet member 112 is expanded to a larger inner diameter against the resiliently inwardly directed force of sheet member 112. Connecting device 110 is retained in the form of an expanded diameter by means of the first inner heat sensitive adhesive bonding material 116. The heat sensitive adhesive bonding material may perform this function by preventing movement of at least one of the ends of the overlapping coil as shown in FIG. 3 at 121 without any adhesive appearing between the overlapping surfaces of the coil sheet member 112. Alternatively, as shown in FIG. 4, the first layer of heat sensitive adhesive bonding material 116 may appear partially between the overlapping surfaces as shown at 125. Alternatively, as shown in FIG. 5, the first layer or inner layer of heat sensitive adhesive bonding material 116 may entirely fill the area between the overlapping surfaces of coil sheet member 112 as shown at 127. Therefore, the resilient sheet member 112 is held in the expanded condition by the heat sensitive adhesive bonding material 116. The coiled sheet member is released and allowed to contract when the heat sensitive adhesive bonding material is raised to its melting point temperature.

Figure 6:
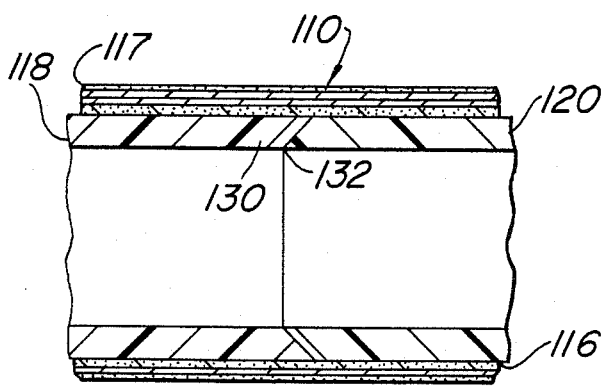
FIG. 6 is a cross-sectional view of another embodiment of the present invention illustrating a means of sealing the junction of the tubular members.

In many applications, it may be desirable or necessary to prevent the flow of adhesive into the internal space of the tubular members being joined. Preventing this flow, prevents any obstruction within the tubular members. This may be accomplished as shown in FIG. 6 wherein the tubular members 118 and 120 to be joined are provided with mating ends 130 and 132 in the form of a chamfer. However, it is understood that other mating end forms may be provided on the ends of tubing 118 and 120, although chamfering as shown is presently preferred as it provides the additional advantage of an automatic centering function between the tubing to be joined.

Alternatively, a narrow thin ring sheet closure or tape, such as polyester tape may be utilized to wrap the junction of tubing to be joined to prevent the flow of adhesive into the tubing. One such suitable polyester tape is commercially available under the name "MYLAR" from the E. I. du Pont de Nemours & Co.

After the formation of a connection between tubular members, as shown in FIG. 6, a second layer of heat sensitive adhesive bonding material 117 may be applied to the outer surface of the sheet member coil 112 as shown in FIG. 6. This is a preferred embodiment where it may be desirable or necessary to anchor tubing to the internal surface of another conduit, such as the pipe. In this manner, the outer surface of the connector may be bonded to the internal surface of the pipe. It is intended that the second layer of adhesive 117 may be applied to all of the embodiments shown in FIGS. 1 through 5 after the formation of a connection. The second layer of heat sensitive adhesive bonding material may be comprised of the same type of material as discussed above with respect to the first heat sensitive adhesive bonding material 116.

Referring now to FIG. 7, there is shown another embodiment of the present invention wherein a connecting device 140 in accordance wth the present invention is utilized to join together a tubular member 142 and an expandable tubular member 144. Expandable tubular member 144 may be of a construction similar to that described in U.S. Pat. Nos. 4,394,202 and 4,410,391, which are assigned to the assignees herein. Expandable tubular member 144 may be comprised of a cross-linked tubular member which is preshrunk and which expands to its normal condition upon heating. The subject matter of the two aforesaid patents is incorporated herein by reference the same as if set forth at length. The expandable tubular member 144 may be provided with its own outer adhesive layer 146 and with an internal coil spring element 148 to provide added direction and force control in its expansion process and in maintaining the expanded unit in its expanded condition for extended periods of time, as it is intended to be expanded within a pipe.

Referring jointly to FIGS. 7 and 8, connector device 140 is comprised of a coiled sheet member 152 with a first inner heat sensitive adhesive layer 156 and a second outer heat sensitive layer 157 which was applied subsequent to the formation of the connection. The combination of adhesive layers 156 and 157 may form a chamfered edge as shown at 159. Tape 160, such as Mylar tape or other suitable polyester tape, may be applied at the junction of tubular member 142 and expandable tubular member 144 prior to the application of connecting device 140 to prevent the flow of any adhesive 156 into the joint. Connecting device 140 is then heated to form a connection between tubular member 142 and expandable tubular member 144. Upon melting of the heat sensitive adhesive and contraction of the coiled sheet member 152, and upon subsequent cooling of heat sensitive adhesive layer 156, a strong connection is formed between tubular member 142 and expandable tubular member 144.

Upon formation of the connection between tubular member 142 and expandable tubular member 144, and after cooling of the first layer of heat sensitive adhesive material 156, a second layer of heat sensitive adhesive material 157 is applied to the outer surface. This second layer of heat sensitive adhesive material is intended to provide a bond between the connecting device and the internal surface of a pipe into which the expandable unit and the connecting device are to be inserted, with it being intended that the expandable tubular member 144 is then expanded within the pipe and the second layer of adhesive 157 along with adhesive layer 146 forms a bond to the pipe.

It is intended that the expandable unit or expandable tubular member 144 is to be expanded by heating to engage the containing pipe. In this process, a bulb will form at the end to engage that pipe fitting in which it is placed. This will provide a pressure seal and structural bond under a degree of geometric control exerted by the resilient sheet member.

As described in the aforesaid reference patents, expandable tubular member 144 with tubular member 142 is intended to be mounted within a pipe 162 or the like. Pipe 162 may be a pipe for supplying natural gas which is connected to a gas main, not shown, by means of a "T" connector 164. It is understood that the bulb end of expandable unit 144 may be expanded in any suitable connection or union in the pipe, including elbows, unions or the like in addition to "T" connectors. Tubular member 144 in its unexpanded state, with tubular member or tubing 142 connected thereto, is inserted into the pipeline 162 in the direction of arrow 166 from an access point, such as within the basement of a building, until the unexpanded tubular member 144 is within "T" connector 164. A heating device placed within tubular member 144 is then activated causing expandable tubular member 144 to expand as shown in FIG. 9. For clarity in description, the expanded tubular member in FIG. 9 will be given the numeral 174 with the expanded spring being number 168. FIG. 9, in solid lines, illustrates the end result after tubular member 144 has been expanded and bonded in the pipeline and after a boring device has been subsequently utilized to make an opening 170 in the end of the expanded unit 174 for gas or other fluid flow after pressure testing of the new elements in place, as inserted and bonded to the existing containing pipe and end fitting.

Reference should now be had jointly to FIGS. 9 and 10. As shown therein, upon the expansion of expandable tubular member or unit 144 to its expanded state, referred to as 174, by the heating of expandable unit 144, coiled sheet member 152 is caused to assume a conforming limited degree of frustroconical transition shape with the larger diameter being over the expanded unit 174 and the smaller diameter being over tubing 142. The heating and expansion of unit 174 also causes a limited amount of flow of the inner layer of adhesive 156 from area 178 over expandable unit 174 to area 180 over tubular member or tubing 142. The heating also causes a bonding of the outer layer of adhesive 157 at 182 to the inner surface of pipe 162. In this manner, not only does the conecting device 140 enable the connection together of two tubular members and accomodates their diameter transition after the formation of the connection, but it also enables the bonding of tubing 142 to the inner surface of a pipe in which the assembly is mounted as may be required by certain regulations in the gas distribution industry or other regulations, to provide restraint and structured anchorage of axial forces which may appear on the inserted tubing and prevent their appearance in the fabric of the expanding member.

In a preferred embodiment, tubular member 142 may be comprised of a straight section of a relatively short length. For example, preferably, tubular member 142 may be comprised of a length of two to three feet or other suitable length selected in the range of one to four feet. The free end, or the end opposite to connecting device 140, not shown in the drawings, would be connected by a similar connecting device to a coil of flexible tubing prior to being inserted into the line. The providing of a selected length of straight tubing enhances the ability to feed the completed assembly of the expandable unit or expandable tubular member 144 into the line. This provides a significant advantage in being able to feed an assembled unit through a section of line which not infrequently extends for distances of up to 100 feet or more.

The present invention may be embodied in other specific forms without departing from the spirit or essential attributes thereof and, accordingly, reference should be made to the appended claims, rather than to the foregoing specification as indicating the scope of the invention.

We claim:

1. A device for connecting together tubular members, comprising:
    a resilient sheet member in the form of a coil having at least partially overlapping surfaces, the inner diameter of said sheet member coil being less than the outer diameters of the members to be joined;
    a first heat sensitive adhesive bonding material applied to the inner surface of said sheet member coil;
    said sheet member coil being expanded to a larger diameter against a resiliently inwardly directed force of said sheet member and held in said expanded condition by said heat sensitive adhesive bonding material, the expanded larger diameter being of a sufficient diameter to receive the ends of said members to be joined, whereby said ends may be easily inserted into said coiled sheet member, said coiled sheet member being heatable whereby said heat sensitive adhesive bonding material holding said coil expanded melts allowing said sheet member to contract inwardly forming a tight bond between the inner surface of said sheet member and said members to be joined to form a strong bond upon cooling of said first heat sensitive bonding material between said inner surface of said coil and said tubular member being joined with said resilient sheet member coil providing support; and
    a second heat sensitive adhesive bonding material applied to the outer surface of said sheet member coil after cooling of said first heat sensitive adhesive bonding material.

2. A device in accordance with claim 1 wherein said heat sensitive adhesive bonding material is provided at least partially between the overlapping surfaces of said coil.

3. A device in accordance with claim 1 wherein said heat sensitive adhesive bonding material is provided between the entire overlapping surfaces of said coil.

4. A device in accordance with claim 1 wherein at least one of said members to be joined is a member which expands upon heating.

5. A device in accordance with claim 1 wherein said members to be joined are provided with a male and female chamfer whereby flow of said heat sensitive adhesive bonding material into said tubular members may be impeded.

6. A device in accordance with claim 1 wherein a sheet closure is provided over the junction of the tubular members to be joined prior to the formation of the connection whereby flow of said first heat sensitive adhesive bonding material into said tubular members may be avoided.

7. A device in accordance with claim 6 wherein said sheet closure is a polyester tape.

8. A device for forming a connection between a tubular member and a tubular unit adapted for expansion, comprising:
    a resilient sheet member in the form of a coil having at least partially overlapping surfaces, the diameter of said sheet member coil being less than the outer diameters of the expandable unit and the tubular member to be joined;
    a first heat sensitive adhesive bonding material applied to the inner surface of said sheet member coil;
    said sheet member coil being expanded to a larger diameter against a resiliently inwardly directed force of said sheet member and held in said expanded condition by said first heat sensitive adhesive bonding material, the expanded larger diameter being of a sufficient diameter to receive the ends of said expandable unit and said tubular member to be joined, whereby, said ends may be easily inserted into said sheet member coil, said sheet member coil being heatable whereby said first heat sensitive adhesive bonding material holding said coil expanded melts allowing said sheet member coil to contract inwardly forming a tight bond between the inner surface of said sheet member and said expandable unit and said tubular member to be joined to form a strong bond; and upon subsequent heating of said expandable unit, said expandable unit expands causing said resilient sheet member to assume a minimal degree of frustro-conical shape with a limited flow of said adhesive bonding material from the area over said expandable unit to the area over said tubular member.

9. A devide for forming a connection between a tubular member and a tubular unit adapted for expansion in accordance with claim 8 including a second heat sensitive adhesive bonding material applied to the outer surface of said sheet member coil subsequent to the cooling of said first heat sensitive adhesive bonding material.

10. A device for forming a connection between a tubular member and a tubular unit adapted for expansion in accordance with claim 8 wherein said first heat sensitive adhesive bonding material is provided at least partially between the overlapping surfaces of said coil.

11. A device for forming a connection between a tubular member and a tubular unit adapted for expansion in accordance with claim 8 wherein said first heat sensitive adhesive bonding material is provided between the entire overlapping surfaces of said coil.

12. A device for forming a connection between a tubular member and a tubular unit adapted for expansion in accordance with claim 8 wherein a sheet member is provided over the junction of the tubular members to be joined prior to the formation of the connection whereby flow of said first heat sensitive adhesive bonding material into said tubular members may be avoided.

13. A device for forming a connection between a tubular member and a tubular unit adapted for expansion in accordance with claim 12 wherein said sheet member is a polyester tape.

14. A device for forming a connection between a tubular member and a tubular unit adapted for expansion in accordance with claim 9 wherein said second heat sensitive adhesive bonding material bonds to the internal surface of a pipewall upon expansion of said expandable unit in a pipe.

15. A device in accordance with claim 9 wherein said tubular member is comprised of a predetermined length of straight section, which is adapted at its free end to be connected to a free end of a coil of tubular material.

16. A device in accordance with claim 15 wherein said predetermined length of straight tubular member is selected to be within the range of one foot to four feet.

* * * * *